(12) United States Patent
Troyer, Jr.

(10) Patent No.: US 7,086,194 B1
(45) Date of Patent: Aug. 8, 2006

(54) COMBINED FISHING ROD HOLDER AND STRIKE NOTIFICATION ASSEMBLY

(76) Inventor: Reuben Troyer, Jr., 56185 Blossom Rd., Colon, MI (US) 49040

( * ) Notice: Subject to any disclaimer, the term of this patent is extended or adjusted under 35 U.S.C. 154(b) by 0 days.

(21) Appl. No.: 11/029,936

(22) Filed: Jan. 6, 2005

(51) Int. Cl.
*A01K 97/12* (2006.01)
(52) U.S. Cl. ........................................ 43/15
(58) Field of Classification Search ............ 43/15, 43/16
See application file for complete search history.

(56) References Cited

U.S. PATENT DOCUMENTS

| | | | | |
|---|---|---|---|---|
| 2,689,426 | A | * | 9/1954 | Baenen ............... 43/15 |
| 2,713,741 | A | * | 7/1955 | Gnagy ............... 43/16 |
| 2,770,906 | A | * | 11/1956 | Hood ............... 43/16 |
| 3,284,943 | A | * | 11/1966 | Wedel ............... 43/15 |
| 3,475,847 | A | * | 11/1969 | Wilson ............... 43/15 |
| 3,562,947 | A | * | 2/1971 | Martin ............... 43/15 |
| 3,591,970 | A | * | 7/1971 | Davenport ............... 43/15 |
| 4,031,651 | A | * | 6/1977 | Titze ............... 43/15 |
| 4,471,553 | A | * | 9/1984 | Copeland ............... 43/15 |
| 4,550,519 | A | * | 11/1985 | Simmons et al. ............... 43/15 |
| 5,050,332 | A | * | 9/1991 | Cross ............... 43/15 |
| 5,524,376 | A | * | 6/1996 | Flisak ............... 43/15 |
| 5,903,998 | A | * | 5/1999 | Hawkins et al. ............... 43/15 |
| 5,930,938 | A | * | 8/1999 | De Fraties et al. ............... 43/15 |
| 6,050,019 | A | | 4/2000 | Anderson |
| 6,336,287 | B1 | * | 1/2002 | Lobato ............... 43/16 |
| D461,522 | S | | 8/2002 | James et al. |
| 6,430,864 | B1 | | 8/2002 | Thomure et al. |
| 6,539,662 | B1 | * | 4/2003 | Heath ............... 43/15 |
| 6,681,516 | B1 | | 1/2004 | Fayerman et al. |
| 6,684,555 | B1 | | 2/2004 | Vela |

* cited by examiner

*Primary Examiner*—Kurt Rowan

(57) ABSTRACT

An apparatus includes a rigid frame that has a plurality of integrally connected support sections for defining an anchor. The apparatus further includes an elongate and tubular shaft for receiving a proximal end portion of the fishing rod. The tubular shaft has a top end portion pivotally attached to the anchor frame such that the tubular shaft can be articulated along an arcuate path. The tubular shaft extends substantially orthogonal to the anchor frame when biased to the operating position. A mechanism is included for automatically notifying the user when a fish has engaged the bait. The notifying mechanism is operably engaged with the tubular shaft and the anchor frame while protruding forwardly therefrom and towards a body of water.

14 Claims, 4 Drawing Sheets

COMBINED FISHING ROD HOLDER AND STRIKE NOTIFICATION ASSEMBLY

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a fishing rod holder and, more particularly, to a fishing rod holder for notifying a user whether a fish has engaged bait attached to the fishing rod line.

2. Prior Art

Fishermen typically use one or more fishing rods and reels while fishing. In many states, multiple fishing poles are allowed, while in others only one can be used. When more than one rod is in use, it is difficult for a fisherman to handle all at the same time. It is also true that often the fishing poles are set down or leaned against something so the fisherman does not have to constantly tend to the fishing rod or rods. This is because fish do not always hit immediately when the baited hook is placed in the water.

During these times of waiting or when one or multiple poles are in use, it is handy to have a means for holding the fishing rods. It is even more beneficial if the means also assists the fisherman in catching fish. There have been many types of rod holders made and are known in the art. Some are very simple, while others are more complex. The simplest is simply a tube holder for receiving a handle of a fishing pole. However, these are only holders and they do not help to catch fish. The most they do is to give the arms of the fisherman some relaxation.

Some of the apparatuses previously known in the art also had a problem of losing the rod and reel. When the fish struck, the fishing pole was often pulled from the apparatus. Likewise, when the trigger activated, the sudden jerk, along with the pull by the fish, would throw the pole from the holder. This can become very costly after multiple rods and reels are lost in such a manner.

Accordingly, a need remains for a fishing rod holder in order to overcome the above-noted shortcomings. The present invention satisfies such a need by providing a fishing rod holder that is sturdy in design, easy to use, light weight, cost effective, and provides a fisherman with better means for catching and landing more fish. Such a fishing rod holder allows users to insert their rod and set the trigger so that they do not have to hold the rod all day and their hands remain free to perform other tasks. This fact and the automatic striking feature makes fishing easier and more convenient, and a fisherman can catch more fish by missing fewer strikes. Furthermore, the rod holder advantageously keeps the rod and reel off of the ground, thus preventing scratches and dirt from getting onto the rod and reel.

BRIEF SUMMARY OF THE INVENTION

In view of the foregoing background, it is therefore an object of the present invention to provide a fishing rod holder. These and other objects, features, and advantages of the invention are provided by an apparatus for holding a fishing rod and associated line at an operating position and for notifying a user when a fish has engaged bait attached to the fishing rod line.

The apparatus includes a rigid frame having a plurality of integrally connected support sections for defining an anchor against which the fishing rod is laid. Such an anchor frame is removably engageable with a ground surface.

The present invention also includes an elongate and tubular shaft sized and shaped for receiving a proximal end portion of the fishing rod therein. Such a tubular shaft has a top end portion pivotally attached to the anchor frame such that the tubular shaft can be selectively articulated along an arcuate path defined between a selected quadrant. The tubular shaft extends substantially orthogonal to the anchor frame when biased to the operating position.

Advantageously, a mechanism is included for automatically notifying the user when a fish has engaged the bait wherein the notifying mechanism is operably engaged with the tubular shaft and the anchor frame while protruding forwardly therefrom and towards a body of water. Such an automatic notification mechanism preferably includes a resiliently deformable helical spring having opposed end portions secured to the tubular shaft and positioned forwardly therefrom along a generally linear plane. An auxiliary frame may be integrally attached to the anchor frame wherein the auxiliary frame includes a front end portion operably connected to the helical spring member such that the helical spring member can effectively be maintained at a tensed state when the tubular shaft is biased to the operating position. The auxiliary frame may be provided with a generally V-shaped front end portion having an inverted apex connected to the helical spring.

Preferably, a locking assembly is attached to the auxiliary frame and spaced above the helical spring member wherein a shaft of the fishing rod is situated subjacent to the locking assembly while the tubular shaft is maintained at the operating position. The helical spring member is releasable from the tensed state for causing the fishing rod shaft to abruptly pivot upwardly and disengage the locking assembly when a fish engages the bait. The locking assembly preferably includes an actuator arm pivotally connected to a selected portion of the auxiliary frame.

Such an actuator arm has a generally linear shape and traverses a longitudinal length of the fishing rod shaft. A receiving arm may be pivotally connected to another portion of the auxiliary frame and aligned to intersect a travel path of the actuator arm. Such a receiving arm has an offset finger portion integral therewith such that the fishing rod line can be looped therethrough. The receiving arm is caused to pivot about a selected plane and thereby release the actuator arm when a fish tugs on the fishing rod line such that the fishing rod shaft can be adapted to a substantially vertical position. The actuator arm may be pivotal along a first plane and the receiver arm may be pivotal along a second plane. Such first and second planes define arcuate paths aligned substantially orthogonal to each other.

Preferably, the arcuate path of the tubular shaft pivots along a third plane such that the first, second and third planes are generally aligned along the x-, y- and z-axes respectively. In an alternate embodiment, the apparatus may further include a base plate that has a generally rectangular shape provided with a plurality of oppositely situated apertures for receiving fastening members therethrough such that the base plate can advantageously be securely attached to the support surface. Such a base plate is statically engaged with the frame.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
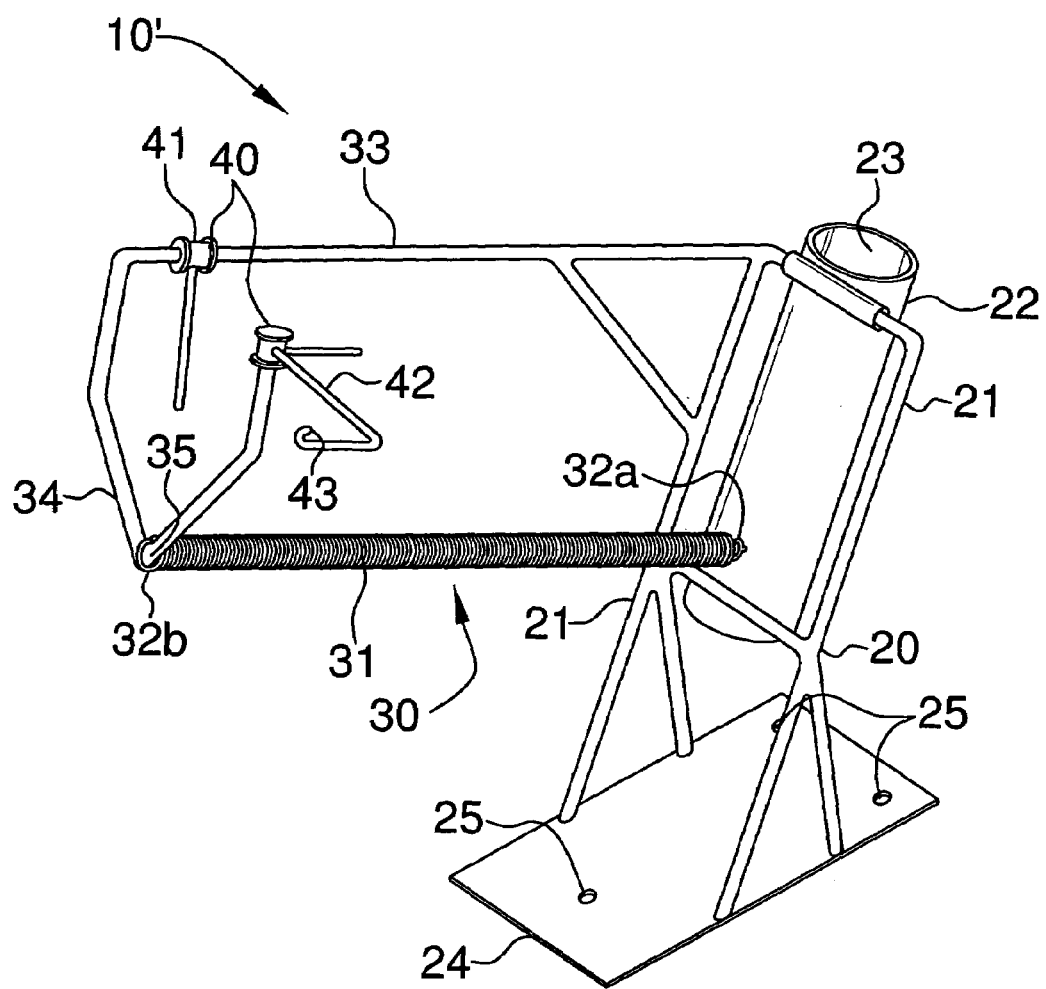
FIG. 1 is a perspective view showing fishing rod holder, in accordance with the present invention.
Figure 2:
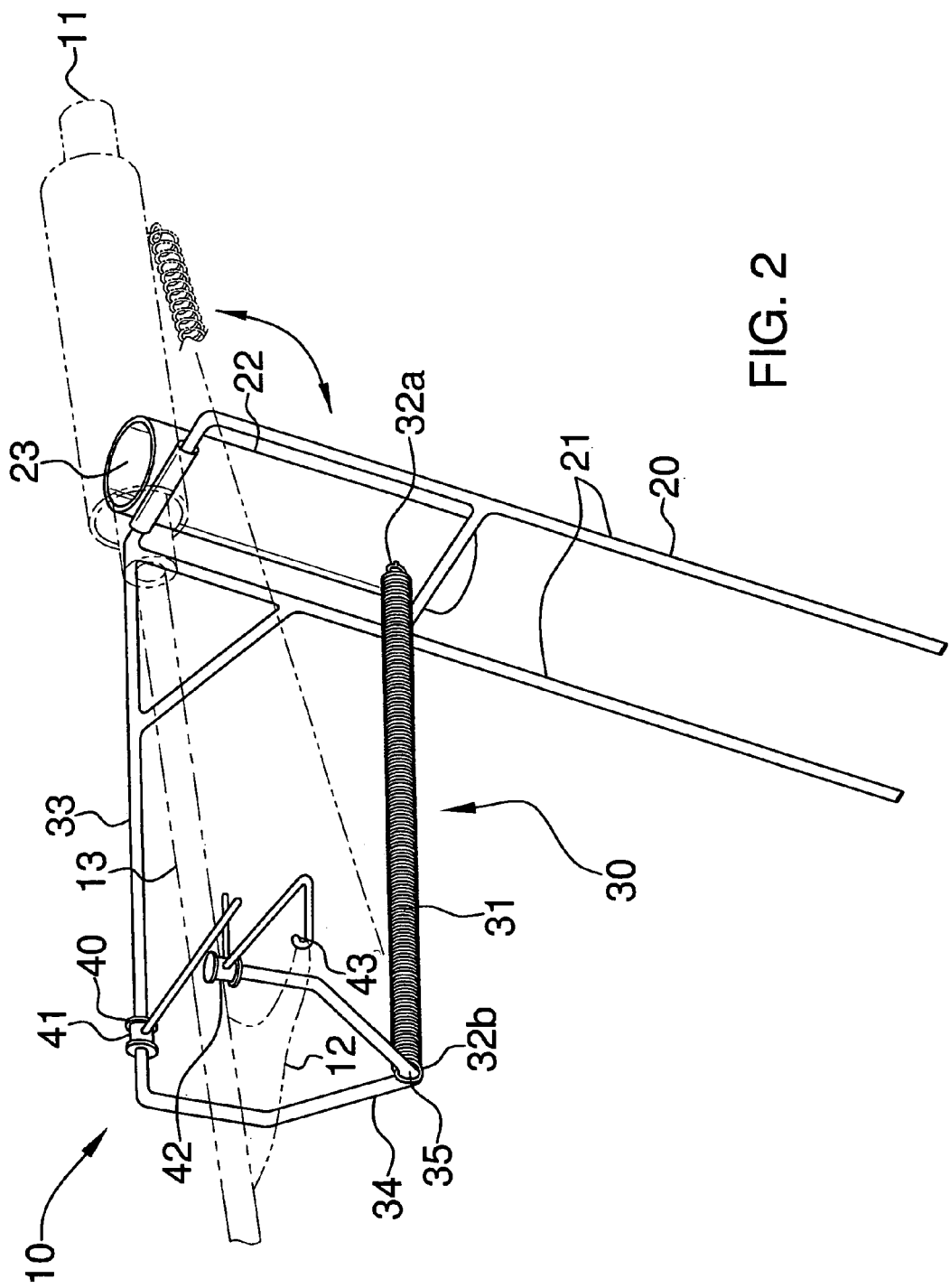
FIG. 2 is a perspective view showing an alternate embodiment of the apparatus shown in FIG. 1.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art. Like numbers refer to like elements throughout the figures, and prime and double prime numbers refer to like elements in alternate embodiments.

The apparatus of this invention is referred to generally in FIGS. 1–4 by the reference numeral 10 and is intended to provide a fishing rod holder. It should be understood that the apparatus 10 may be used to hold many different types of fishing rods and should not be limited in use to only salt water fishing rods.

Referring initially to FIG. 1, the apparatus 10 includes a rigid frame 20 that has a plurality of integrally connected support sections 21 for defining an anchor against which the fishing rod 11 is laid. Such an anchor frame 20 is removably engageable with a ground surface, such that same may advantageously be easily transported from one location to the next, as is often the case when fishing. Such an anchor frame 20 may, of course, be produced in a variety of different sizes and colors, so as to meet the needs of various types of fishing. In the event that a fisherman has more than one fishing rod 11, multiple apparatuses 10 may be used to conveniently bait and set all his fishing rods 11, which would otherwise not be possible, and further increases the chance of catching a fish.

Referring to FIGS. 1 through 4, the present invention also includes an elongate and tubular shaft 22 sized and shaped for receiving a proximal end portion of the fishing rod 11 therein. Such a tubular shaft 22 has a top end portion 23 pivotally attached to the anchor frame 20 such that the tubular shaft 22 can be selectively articulated along an arcuate path defined between a selected quadrant. The tubular shaft 22 extends substantially orthogonal to the anchor frame 20 when biased to the operating position, thus allowing a fishing rod 11 placed therein to extend horizontally over the body of water, as is most desired by fishermen.

Still referring to FIGS. 1 through 4, a mechanism 30 is included for automatically notifying the user when a fish has engaged the bait wherein the notifying mechanism 30 is operably engaged with the tubular shaft 22 and the anchor frame 20 while protruding forwardly therefrom and towards a body of water. The automatic notifying mechanism 30 advantageously allows a fisherman to set the fishing rod 11 up in the apparatus 10 and then to proceed with other activities.

Such an automatic notification mechanism 30 includes a resiliently deformable helical spring 31 that has opposed end portions 32A, 32B secured to the tubular shaft 22 and positioned forwardly therefrom along a generally linear plane. An auxiliary frame 33 is integrally attached to the anchor frame 20 wherein the auxiliary frame 33 includes a front end portion 34 operably connected to the helical spring member 31 such that the helical spring member 31 can effectively be maintained at a tensed state when the tubular shaft 22 is biased to the operating position. This feature advantageously provides the required tension for effectively pivoting the fishing rod 11 upwards and away from the body of water when a fish engages bait on the fishing rod line 12. The auxiliary frame 33 is provided with a generally V-shaped front end portion 34 having an inverted apex 35 connected to the helical spring 31. Such a V-shaped front end portion 34 may also conveniently be used to prop the fishing rod 11 up off of the ground during non operating conditions.

Still referring to FIGS. 1 through 4, a locking assembly 40 is attached to the auxiliary frame 33 and spaced above the helical spring member 31 wherein a shaft 13 of the fishing rod 11 is situated subjacent to the locking assembly 40 while the tubular shaft 22 is maintained at the operating position. The helical spring member 31 is releasable from the tensed state for causing the fishing rod shaft 13 to abruptly pivot upwardly and disengage the locking assembly 40 when a fish engages the bait.

The locking assembly 40 includes an actuator arm 41 pivotally connected to a selected portion of the auxiliary frame 33. Such an actuator arm 41 has a generally linear shape and traverses a longitudinal length of the fishing rod shaft 13. A receiving arm 42 is pivotally connected to another portion of the auxiliary frame 33 and aligned to intersect a travel path of the actuator arm. Such a receiving arm 42 has an offset finger portion 43 integral therewith such that the fishing rod line 12 can be looped therethrough. The receiving arm 42 is caused to pivot about a selected plane and thereby release the actuator arm 41 when a fish tugs on the fishing rod line 12 such that the fishing rod shaft 13 can be adapted to a substantially vertical position.

The actuator arm 41 is pivotal along a first plane and the receiver arm 42 is pivotal along a second plane. Such first and second planes define arcuate paths aligned substantially orthogonal to each other. The arcuate path of the tubular shaft 22 pivots along a third plane such that the first, second and third planes are generally aligned along the x-, y- and z-axes respectively.

Figure 3:
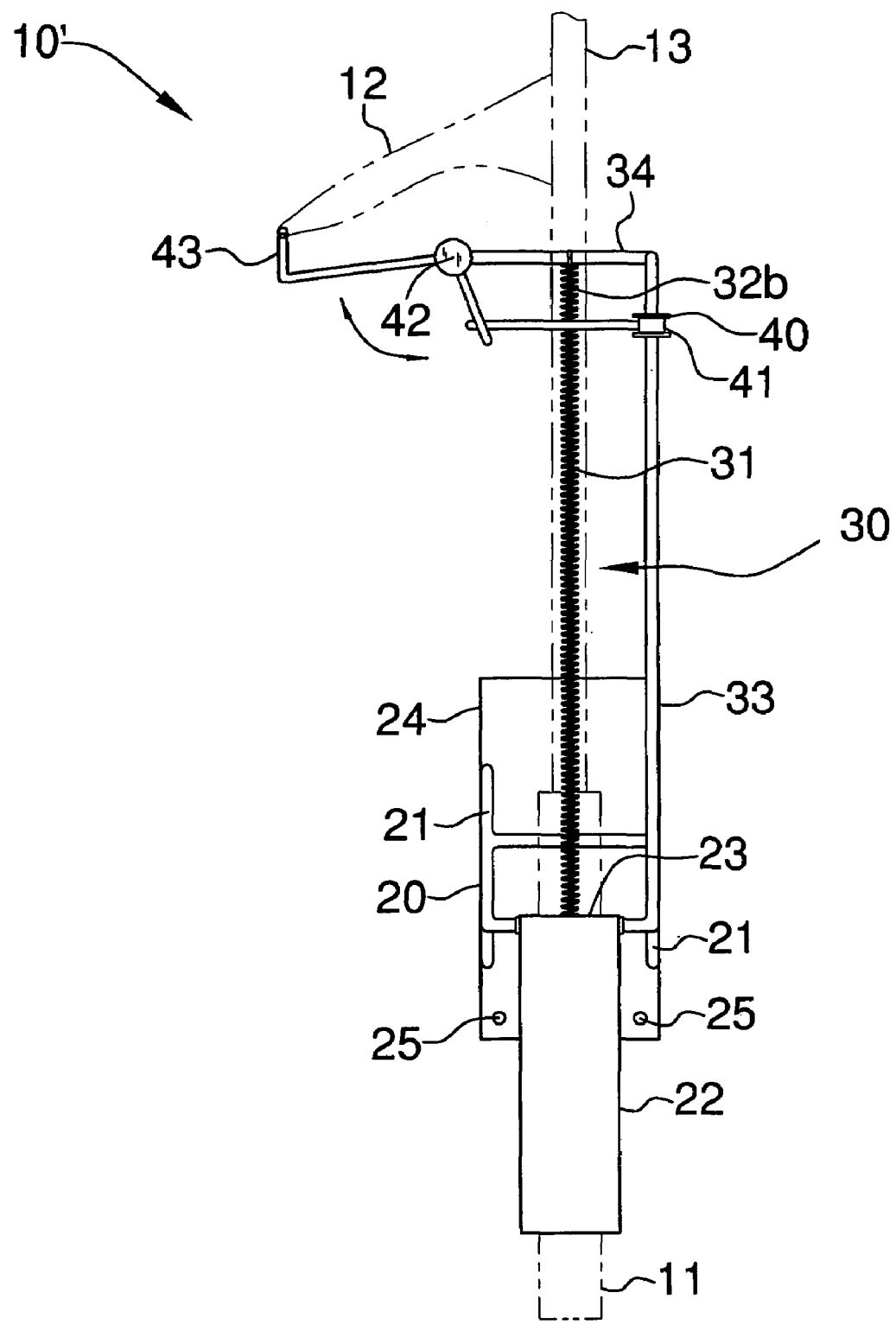
FIG. 3 is a top plan view of the apparatus shown in FIG. 1, showing the apparatus prior to activating the automatic notification mechanism.
Figure 4:
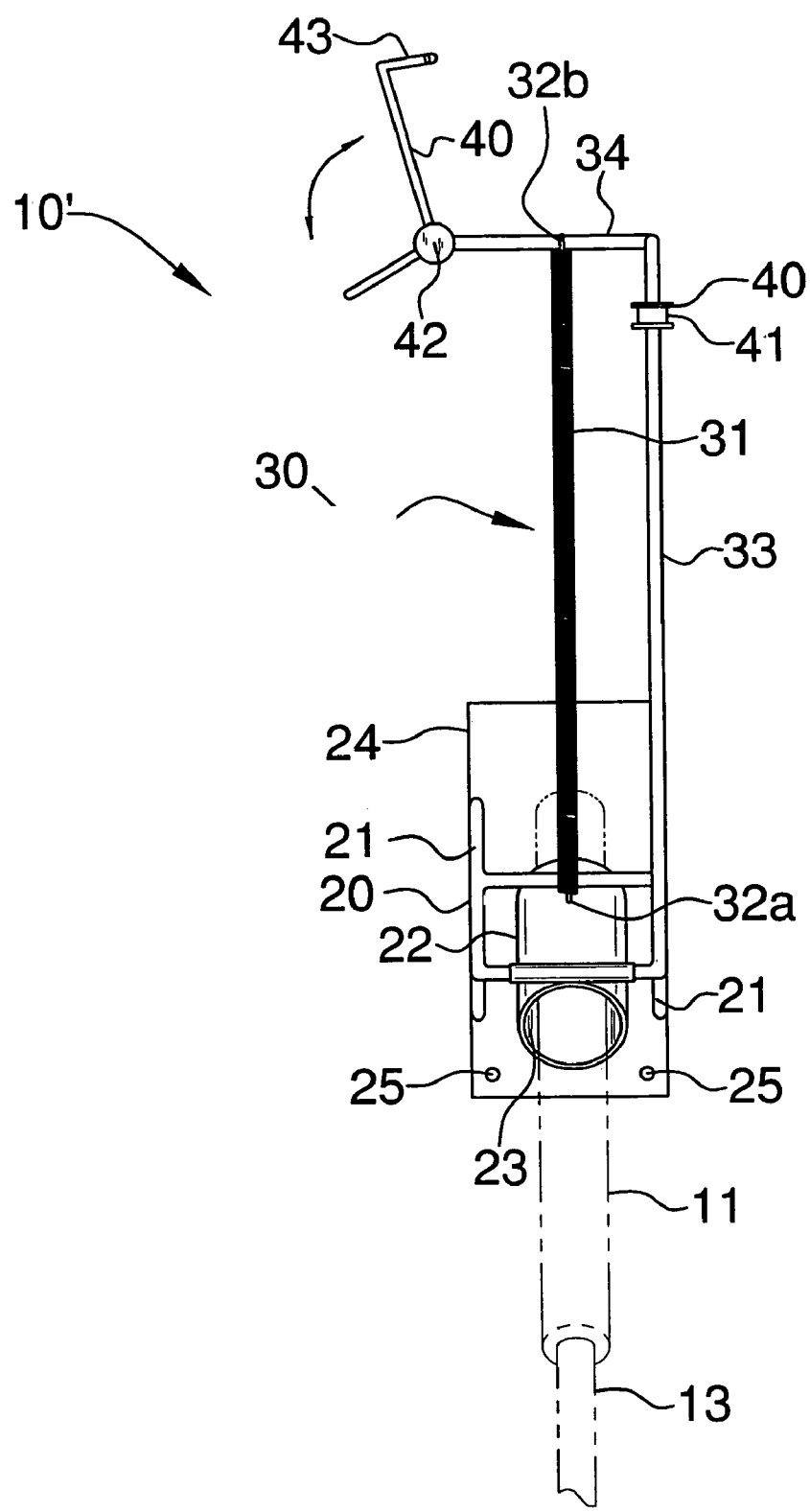
FIG. 4 is a top plan view of the apparatus shown in FIG. 1, showing the apparatus after activating the automatic notification mechanism.

Referring to FIGS. 1, 3 and 4, in an alternate embodiment, the apparatus 10' further includes a base plate 24 that has a generally rectangular shape provided with a plurality of oppositely situated apertures 25 for receiving fastening members (not shown) therethrough such that the base plate 24 can advantageously be securely attached to the support surface. Such a base plate is statically engaged with the frame 20, advantageously ensuring the structural rigidity of the apparatus 10'.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed is:

1. An apparatus for holding a fishing rod and associated line at an operating position and for notifying a user whether a fish has engaged a bait attached to the fishing rod line, said apparatus comprising:
    a rigid frame having a plurality of integrally connected support sections for defining an anchor against which the fishing rod is laid;
    an elongate and tubular shaft sized and shaped for receiving a proximal end portion of the fishing rod therein, said tubular shaft having a top end portion pivotally attached to said anchor frame such that said tubular shaft can be selectively articulated along an arcuate path defined between a selected quadrant; and
    means for automatically notifying the user when a fish has engaged the bait wherein said notifying means is operably engaged with said tubular shaft and said anchor frame while protruding forwardly therefrom and towards a body of water,
    wherein said automatic notification means comprises
        a resiliently deformable helical spring having opposed end portions secured to said tubular shaft and positioned forwardly therefrom along a generally linear plane,
        an auxiliary frame integrally attached to said rigid frame wherein said auxiliary frame includes a front end portion operably connected to said helical spring such that said helical spring can be maintained at a tensed state when said tubular shaft is biased to the operating position, and
        a locking assembly attached to said auxiliary frame and spaced above said helical spring wherein a shaft of the fishing rod is situated subjacent said locking assembly while said tubular shaft is maintained at the operating position,
    wherein said helical spring is releasable from the tensed state for causing the fishing rod shaft to abruptly pivot upwardly and disengage the locking assembly when a fish engages the bait;
    wherein said locking assembly comprises
        an actuator arm pivotally connected to a selected portion of said auxiliary frame, said actuator arm having a generally linear shape and traversing a longitudinal length of the fishing rod shaft, and
        a receiving arm pivotally connected to another portion of said auxiliary frame and aligned to intersect a travel path of said actuator arm, said receiving arm having an offset finger portion integral therewith such that the fishing rod line can be looped therethrough, said receiving arm being caused to pivot about a selected plane and thereby release said actuator arm such that the fishing rod shaft can be adapted to a substantially vertical position.

2. The apparatus of claim 1, wherein said auxiliary frame is provided with a generally V-shaped front end portion having an inverted apex connected to said helical spring.

3. The apparatus of claim 1, wherein said actuator arm is pivotal along a first plane and said receiver arm is pivotal along a second plane, said first and second planes defining arcuate paths aligned substantially orthogonal to each other.

4. The apparatus of claim 3, wherein the arcuate path of the tubular shaft pivots along a third plane such that said first, second and third planes are generally aligned along the x-, y- and z-axes respectively.

5. The apparatus of claim 1, further comprising:
    a base plate having a generally rectangular shape and provided with a plurality of oppositely situated apertures for receiving fastening members therethrough such that said base plate can be securely attached to a support surface, said base plate being statically engaged with said frame.

6. An apparatus for holding a fishing rod and associated line at an operating position and for notifying a user whether a fish has engaged a bait attached to the fishing rod line, said apparatus comprising:
    a rigid frame having a plurality of integrally connected support sections for defining an anchor against which the fishing rod is laid, said anchor frame being removably engageable with a ground surface;
    an elongate and tubular shaft sized and shaped for receiving a proximal end portion of the fishing rod therein, said tubular shaft having a top end portion pivotally attached to said anchor frame such that said tubular shaft can be selectively articulated along an arcuate path defined between a selected quadrant; and
    means for automatically notifying the user when a fish has engaged the bait wherein said notifying means is operably engaged with said tubular shaft and said anchor frame while protruding forwardly therefrom and towards a body of water;
    wherein said automatic notification means comprises
        a resiliently deformable helical spring having opposed end portions secured to said tubular shaft and positioned forwardly therefrom along a generally linear plane,
        an auxiliary frame integrally attached to said rigid frame wherein said auxiliary frame includes a front end portion operably connected to said helical spring such that said helical spring can be maintained at a tensed state when said tubular shaft is biased to the operating position, and
        a locking assembly attached to said auxiliary frame and spaced above said helical spring wherein a shaft of the fishing rod is situated subjacent said locking assembly while said tubular shaft is maintained at the operating position;

wherein said helical spring is releasable from the tensed state for causing the fishing rod shaft to abruptly pivot upwardly and disengage the locking assembly when a fish engages the bait;

wherein said locking assembly comprises an actuator arm pivotally connected to a selected portion of said auxiliary frame, said actuator arm having a generally linear shape and traversing a longitudinal length of the fishing rod shaft, and a receiving arm pivotally connected to another portion of said auxiliary frame and aligned to intersect a travel path of said actuator arm, said receiving arm having an offset finger portion integral therewith such that the fishing rod line can be looped therethrough, said receiving arm being caused to pivot about a selected plane and thereby release said actuator arm such that the fishing rod shaft can be adapted to a substantially vertical position.

7. The apparatus of claim 6, wherein said auxiliary frame is provided with a generally V-shaped front end portion having an inverted apex connected to said helical spring.

8. The apparatus of claim 6, wherein said actuator arm is pivotal along a first plane and said receiving arm is pivotal along a second plane, said first and second planes defining arcuate paths aligned substantially orthogonal to each other.

9. The apparatus of claim 8, wherein the arcuate path of the tubular shaft pivots along a third plane such that said first, second and third planes are generally aligned along the x-, y- and z-axes respectively.

10. The apparatus of claim 6, further comprising:

a base plate having a generally rectangular shape and provided with a plurality of oppositely situated apertures for receiving fastening members therethrough such that said base plate can be securely attached to the support surface, said base plate being statically engaged with said frame.

11. An apparatus for holding a fishing rod and associated line at an operating position and for notifying a user whether a fish has engaged a bait attached to the fishing rod line, said apparatus comprising:

a rigid frame having a plurality of integrally connected support sections for defining an anchor against which the fishing rod is laid, said anchor frame being removably engageable with a ground surface;

an elongate and tubular shaft sized and shaped for receiving a proximal end portion of the fishing rod therein, said tubular shaft having a top end portion pivotally attached to said anchor frame such that said tubular shaft can be selectively articulated along an arcuate path defined between a selected quadrant, said tubular shaft extending substantially orthogonal to said anchor frame when biased to the operating position; and means for automatically notifying the user when a fish has engaged the bait wherein said notifying means is operably engaged with said tubular shaft and said anchor frame while protruding forwardly therefrom and towards a body of water;

wherein said automatic notification means comprises a resiliently deformable helical spring having opposed end portions secured to said tubular shaft and positioned forwardly therefrom along a generally linear plane, an auxiliary frame integrally attached to said rigid frame wherein said auxiliary frame includes a front end portion operably connected to said helical spring such that said helical spring can be maintained at a tensed state when said tubular shaft is biased to the operating position, and a locking assembly attached to said auxiliary frame and spaced above said helical spring wherein a shaft of the fishing rod is situated subjacent said locking assembly while said tubular shaft is maintained at the operating position;

wherein said helical spring is releasable from the tensed state for causing the fishing rod shaft to abruptly pivot upwardly and disengage the locking assembly when a fish engages the bait, wherein said locking assembly comprises an actuator arm pivotally connected to a selected portion of said auxiliary frame, said actuator arm having a generally linear shape and traversing a longitudinal length of the fishing rod shaft, and a receiving arm pivotally connected to another portion of said auxiliary frame and aligned to intersect a travel path of said actuator arm, said receiving arm having an offset finger portion integral therewith such that the fishing rod line can be looped therethrough, said receiving arm being caused to pivot about a selected plane and thereby release said actuator arm such that the fishing rod shaft can be adapted to a substantially vertical position.

12. The apparatus of claim 11, wherein said auxiliary frame is provided with a generally V-shaped front end portion having an inverted apex connected to said helical spring.

13. The apparatus of claim 11, wherein said actuator arm is pivotal along a first plane and said receiving arm is pivotal along a second plane, said first and second planes defining arcuate paths aligned substantially orthogonal to each other.

14. The apparatus of claim 13, wherein the arcuate path of the tubular shaft pivots along a third plane such that said first, second and third planes are generally aligned along the x-, y- and z-axes respectively, said apparatus further comprising a base plate having a generally rectangular shape and provided with a plurality of oppositely situated apertures for receiving fastening members therethrough such that said base plate can be securely attached to the support surface, said base plate being statically engaged with said frame.

* * * * *